United States Patent [19]
Nakamura

[11] Patent Number: 4,872,377
[45] Date of Patent: Oct. 10, 1989

[54] TRANSMISSION RATIO CONTROL SYSTEM FOR A CONTINUOUSLY VARIABLE TRANSMISSION

[75] Inventor: Susumu Nakamura, Tokyo, Japan

[73] Assignee: Fuji Jukogyo Kabushiki Kaisha, Tokyo, Japan

[21] Appl. No.: 185,431

[22] Filed: Apr. 25, 1988

[30] Foreign Application Priority Data

Apr. 30, 1987 [JP] Japan ................. 62-107267

[51] Int. Cl.$^4$ ............................. B60K 41/12
[52] U.S. Cl. ........................ 74/867; 74/474
[58] Field of Search ............ 74/867, 868, 337.5, 74/474, 475, 477; 474/12, 18, 28

[56] References Cited

U.S. PATENT DOCUMENTS

| 4,094,203 | 6/1978 | van Deursen et al. | 474/28 |
| 4,467,674 | 8/1984 | van Deursen et al. | 74/867 |
| 4,565,110 | 1/1986 | Ito | 74/868 |
| 4,612,828 | 9/1986 | Ide et al. | 74/867 X |
| 4,627,313 | 12/1986 | Sakai | 74/867 |
| 4,656,892 | 4/1987 | Miyawaki | 74/868 |
| 4,680,991 | 7/1987 | Miyawaki | 474/28 X |
| 4,730,523 | 3/1988 | Takahashi | 74/868 |

FOREIGN PATENT DOCUMENTS

60-159455 8/1985 Japan .

Primary Examiner—Dwight G. Diehl
Attorney, Agent, or Firm—Martin A. Farber

[57] ABSTRACT

A continuously variable transmission has a drive pulley having a shiftable disc, a driven pulley having a shiftable disc, a belt engaged with both pulleys, a transmission ratio control valve having a spool for controlling oil supplied to a cylinder of the drive pulley. A cam is operatively connected with an accelerator pedal of a vehicle for shifting the spool of the transmission ratio control valve through a spring in accordance with depression of the accelerator pedal. A stopping device is provided for stopping the cam at a predetermined angular position, and a spring is provided between the cam and a shaft which is provided for rotatably supporting the cam and operatively connected to the accelerator pedal. Accordingly the accelerator pedal can be further depressed after the stop of the cam. The stopping device has a stop member operatively connected to the shiftable disc of the drive pulley so as to be moved with the movement of the disc in the upshift direction.

3 Claims, 9 Drawing Sheets

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the start of changing of the transmission ratio for upshifting.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependence on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on pulleys in order to transmit the output of the engine.

At the start of the vehicle, the transmission ratio is set at a maximum value. When the vehicle speed and engine speed reach set values under a driving condition, the transmission ratio starts to change (to upshift). The transmission ratio is automatically and continuously reduced.

In the control system, the transmission ratio control valve is operated to change the transmission ratio in dependence on a balance between force of a spring dependent on the magnitude of the depression of the accelerator pedal and a pivot pressure dependent on the engine speed. Accordingly, the transmission is upshifted so that the vehicle speed increases although the engine speed is constant. However, the upshift starts when the engine speed reaches a considerably high speed. Such an upshift pattern is undesirable in driveability. Therefore, it is preferable to modulate the operation of the transmission ratio control valve to lower the upshift starting speed and to upshift the transmission at a low engine speed in a low vehicle speed range.

Figure 6:
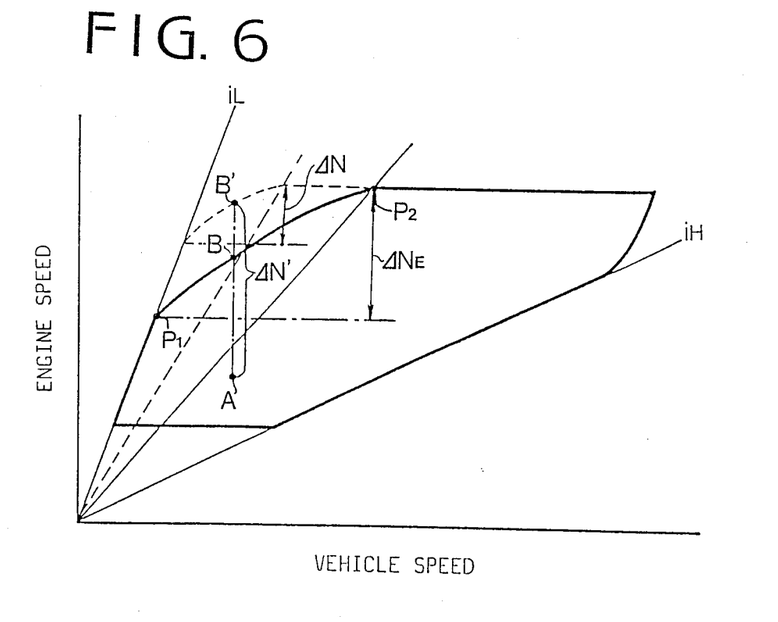
FIG 6 shows a relationship between vehicle speed and engine speed.

In order to meet such a requirement, Japanese Patent Laid Open Nos. 59-159456 (U.S. Pat. No. 4,565,110), and 60-159455 disclose a transmission ratio control valve having a modulator plunger in a spool thereof. A regulator spring is provided between the modulator plunger which is positioned dependent on the line pressure and an operating plunger which is shifted in accordance with the magnitude of the depression of the accelerator pedal. Thus, at the start of the changing of the transmission ratio, since a high line pressure is applied to the modulator plunger, the force of the regulator spring is reduced so that the spool is balanced at a low engine speed. Accordingly, the upshifting starts at a low engine speed. As the transmission is upshifted, the line pressure is reduced, thereby projecting the plunger to increase the force of the regulator spring. Thus, the engine speed at which the spool is balanced becomes progressively higher. In FIG. 6, the dotted line shows the modulated change of the upshifting at a wide-open throttle as a modulator range $\Delta N$.

The modulator range $\Delta N$ is decided dependent on the difference between a maximum line pressure and a minimum line pressure in the transmission system. On the other hand, the line pressure depends on the engine torque, that is on the displacement of the engine. Therefore, in a motor vehicle engine having a small displacement, the line pressure is inevitably low so that the modulator range $\Delta N$ becomes small.

If the modulator range $\Delta N$ is small, the upshift starting engine speed becomes high.

On the other hand, when the kickdown is operated at a point A in FIG. 6, the engine speed is raised to a point B'. The difference in engine speed $\Delta N'$ is so large that a shock occurs. In addition, although the engine speed increases, vehicle speed does not increase.

SUMMARY OF THE INVENTION

The object of the present invention is to provide a transmission ratio control system wherein the transmission ratio starts to change at a low engine speed even though the engine torque is small.

According to the present invention, there is provided a control system for a continuously variable transmission for transmitting the power of an automotive engine to driving wheels of a vehicle, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a hydraulic circuit having a pump for supplying oil to both the hydraulic cylinders and a drain passage for draining oil in the hydraulic cylinder of the drive pulley, a transmission ratio control valve having a plunger slidably mounted in a valve body, a spool for controlling the oil supplied to the cylinder of the drive pulley and the oil drained from the cylinder to change the transmission ratio, at least one spring provided between the plunger, and the spool, a cam operatively connected with an accelerator pedal of the vehicle, for shifting the plunger of the transmission ratio control valve in accordance with depression of the accelerator pedal, pitot pressure apply means for applying pitot pressure dependent on engine speed to the spool to compress the spring.

The system comprises stopping means for stopping the cam at a predetermined angular position thereof, yieldable means provided in a connecting member disposed between the cam and the accelerator pedal for allowing further depression of the accelerator pedal after the stop of the cam, said stopping means including means for progressively displacing the stopping means as the transmission is upshifted so that the cam is further rotated to compress the spring.

In an aspect of the invention the stopping means comprises a stop cam and a stop member operatively connected to the shiftable disc of the drive pulley so as to be moved with the movement of the disc in the upshift direction, and the yieldable means is a spring provided between the cam and a shaft which is provided for rotatably supporting the cam and operatively connected to the accelerator pedal.

The other objects and features of this invention will be apparently understood from the following description with reference to the accompanying drawings.

BRIEF DESCRIPTION OF DRAWINGS

FIG. 3b a sectional view of the modulator device taken along a line B—B of FIG. 3a;

FIG. 3c is a sectional view of the modulator device taken along a line C—C of FIG. 3a;

FIG. 5b is a sectional view of the modulator device of FIG. 5a; and

DETAILED DESCRIPTION OF THE PREFERRED EMBODIMENT

Figure 1A:
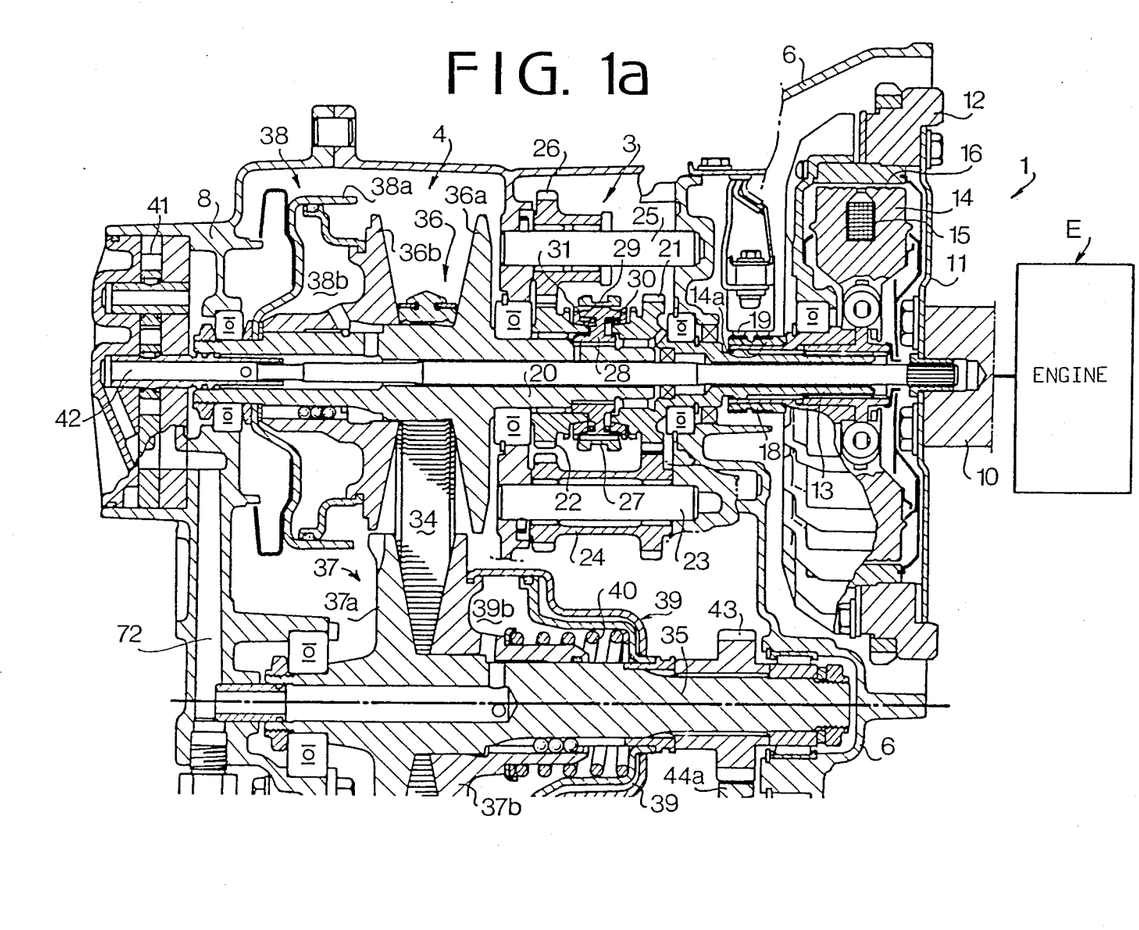
FIGS. 1a and 1b show a sectional view of continuously variable belt-drive transmission to which the present invention is applied.
Figure 1B:
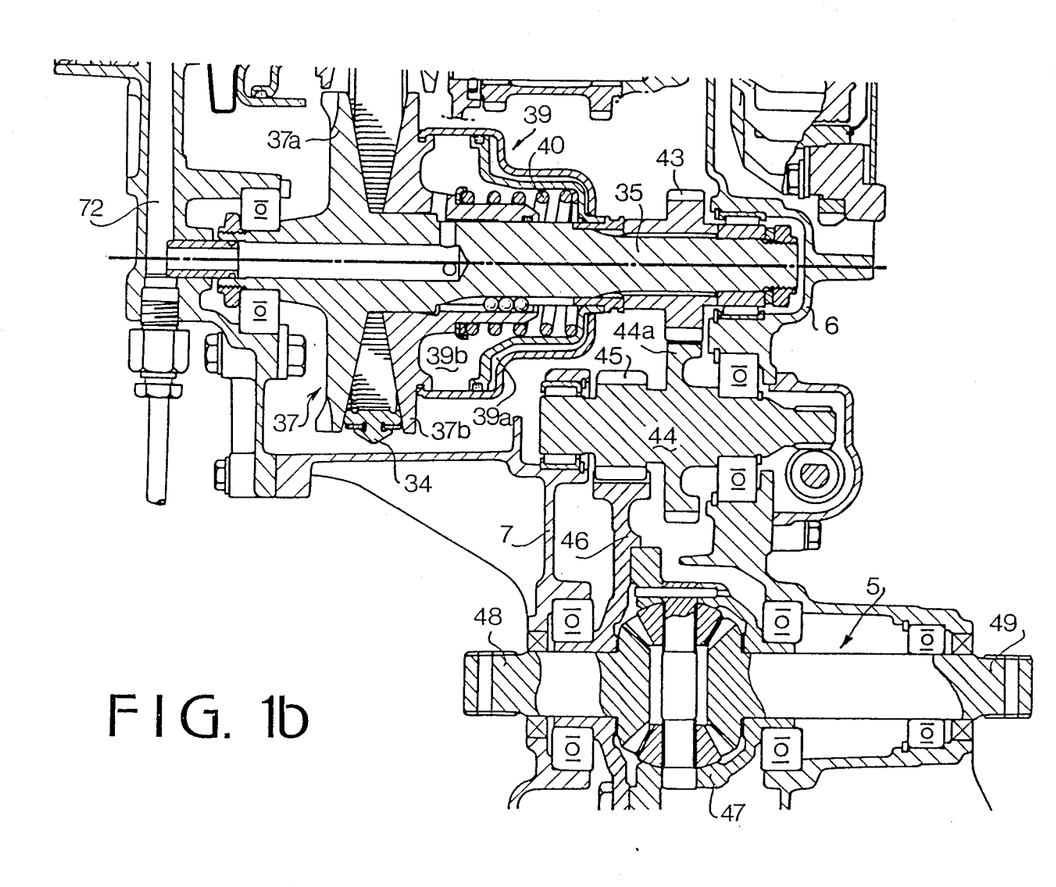

FIGS. 1a and 1b show a power transmission system with a continuously variable belt-drive automatic transmission for a motor vehicle, to which the present invention is applied. An engine E is transversely mounted on a motor vehicle at a front portion thereof. The power transmission system comprises an electromagnetic powder clutch 1, a selector device 3, an infinitely variable belt-drive transmission 4, and final reduction device 5 for front wheels. The electromagnetic powder clutch 1 is provided in a housing 6. The selector device 3, transmission 4 and final reduction device 5 are provided in a main housing 7 and a side housing 8. A crankshaft 10 of the engine E is connected to an annular drive member 12 through a drive plate 11 of the electromagnetic powder clutch 1. The electromagnetic powder clutch 1 comprises a driven member 14, a magnetizing coil 15 provided in the driven member 14. The driven member 14 has its outer periphery spaced from the inner periphery of the drive member 12 by a gap 16. Powder of magnetic material is provided in the gap 16. The driven member 14 is secured to an input shaft 13 of the belt-drive transmission 4. A holder 14a secured to the driven member 14 carries slip rings 18 which are electrically connected to the coil 15. The coil 15 is supplied through brushes 19 and slip rings 18 with current from a control circuit for the electromagnetic powder clutch 1.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) or a parking position (P range) of a selector lever 117 (FIG. 2b), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D, Ds ranges). When the sleeve 29 is engaged with the gear 22, the input shaft 13 is connected to the main shaft 20 through gears 21, 24, 26 and 22 to provide a reverse drive range position (R range).

The main shaft 20 has an axial passage in which an oil pump driving shaft 42 connected to crankshaft 10 is mounted. In the transmission 4, an output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder 38a secured to the main shaft 20 to form a servo device 38 having a chamber 38b.

A fixed conical disc 37a of the driven pulley 37 is formed on the output shaft 35 opposite the movable disc 36b and a movable conical disc 37b is slidably mounted on the output shaft 35 opposite disc 36a. The movable conical disc 37b also slides in a cylinder 39a secured to the output shaft 35 to form a servo device 39. A chamber 39b of the servo device 39 is communicated with an oil pump 41 through a passage 72. A spring 40 is provided to urge the movable conical disc 37b to the fixed conical disc 37a. A drive belt 34 engages with the drive pulley 36 and the driven pulley 37. The movable disc 36b has an area exposed to the line pressure which is larger than the corresponding area of the movable disc 37b.

Secured to the output shaft 35 is a drive gear 43 which engages with an intermediate reduction gear 44a on an intermediate shaft 44. An intermediate gear 45 on the intermediate shaft 44 engages with a final gear 46. Rotation of the final gear 46 is transmitted to axles 48 and 49 of front driving wheels through a differential 47.

Figure 2A:
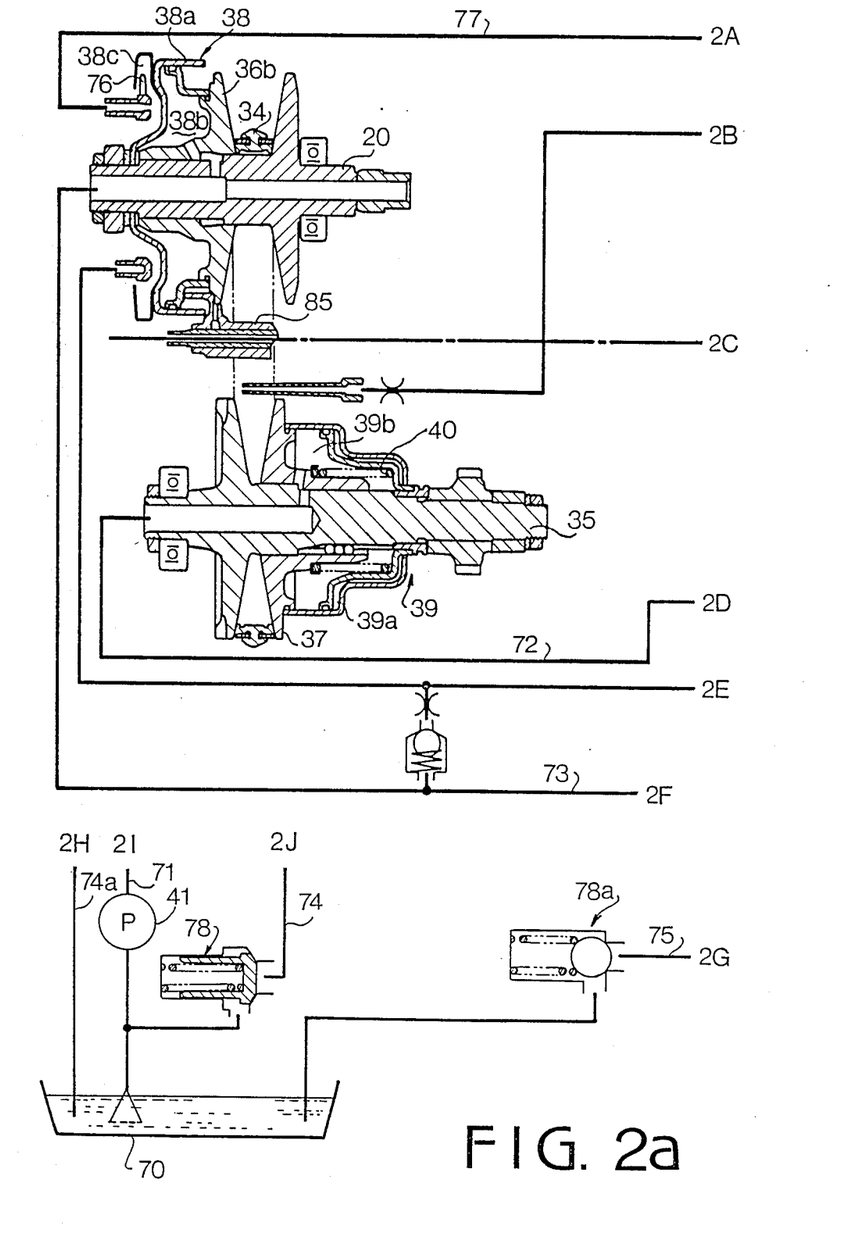
FIGS. 2a to 2c show a hydraulic control circuit according to the present invention.
Figure 2B:
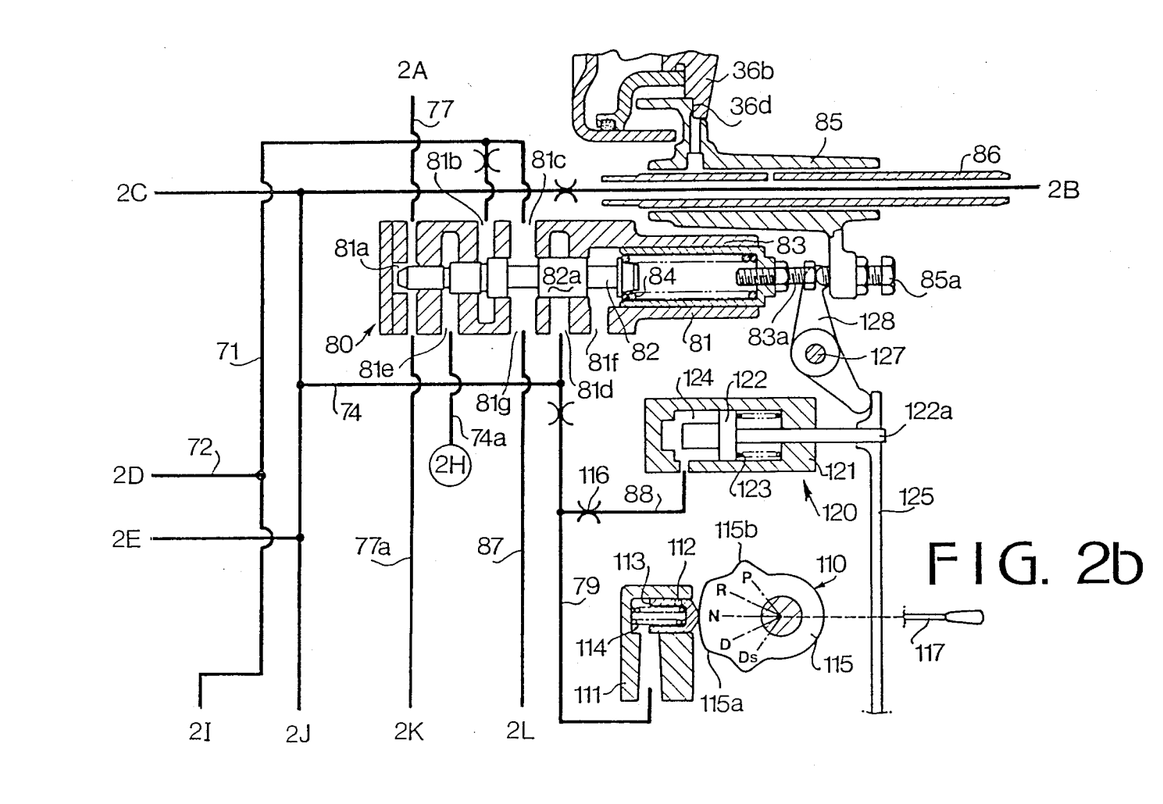
Figure 2C:
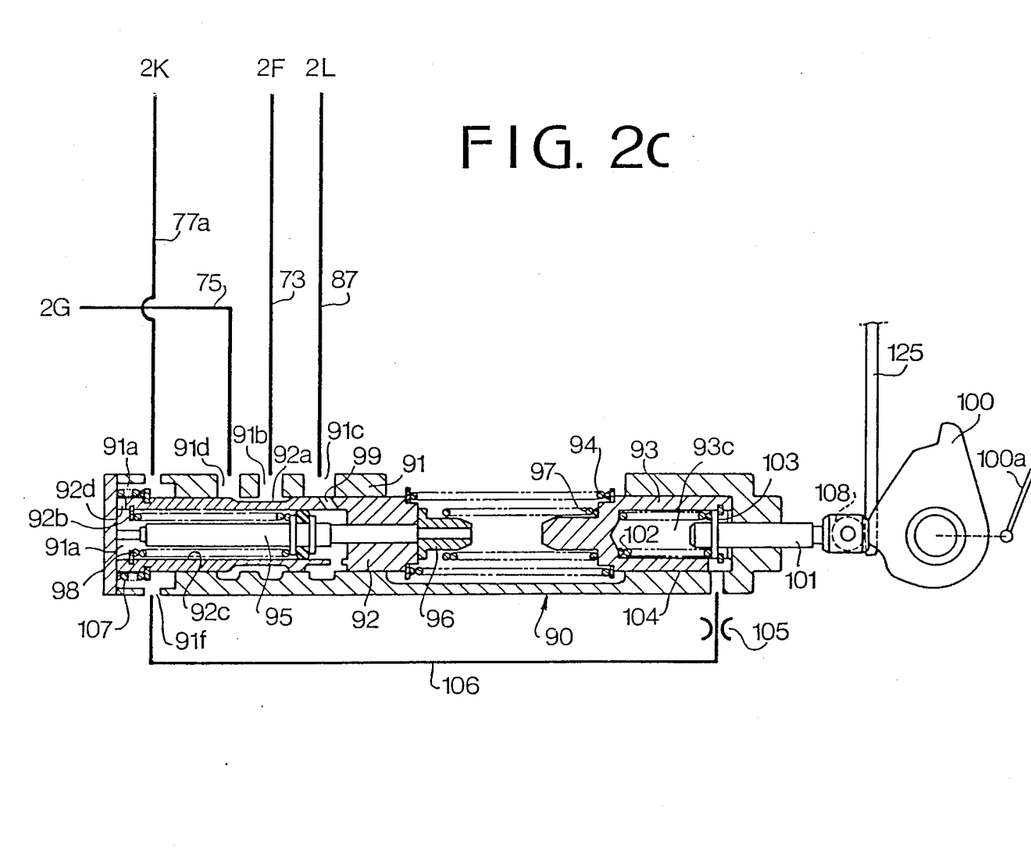

FIGS. 2a to 2c show a hydraulic control circuit according to the present invention. The circuit is provided with a pressure regulator valve 80 and a transmission ratio control valve 90.

The pressure regulator valve 80 comprises a valve body 81, spool 82, spring 84 provided between a spring retainer 83 and one end of the spool 82 for urging the spool to the left.

The transmission ratio control valve 90 comprises a valve body 91, spool 92, operating plunger 93, and spring 94 provided between the spool 92 and the plunger 93. Oil in an oil reservoir 70 is supplied to a port 81b of pressure regulator valve 80 through a passage 71 by the pump 41. An oil passage 72 connected to the passage 71 is communicated with the driven pulley servo chamber 39b. The passage 71 is further communicated with the drive pulley servo chamber 38b through ports 81c and 81g of the regulator valve 80, a passage 87, ports 91c and 91b of the transmission ratio control valve 90 and a passage 73. Oil flows back from a port 81d of the regulator valve 80 to the inlet of the pump 41 through drain passages 74 and a relief valve 78. A drain port 91d of the transmission ratio control valve 90 is communicated with the oil reservoir 70 through a drain passage 75 and a check valve 78a.

The drive pulley cylinder 38a has an annular inside groove 38c in which a rotation speed sensor 76 in the form of a pitot tube is provided for measuring the speed of the oil in the groove 38c that is the speed of the main shaft 20 which is proportional to the engine speed. The pitot pressure produced by the rotation speed sensor 76 is applied to end chambers 81a and 91a of the valves 80 and 90 through passages 77 and 77a.

The port 81d of the pressure regulator valve 80 is communicated with a select position detecting valve 110 at upstream of the relief valve 78 through a passage 79 and further with an actuator 120 for the transmission ratio control valve 90 through a passage 88.

A sensor shoe 85 for detecting the actual transmission ratio is slidably mounted on a lubricating oil pipe 86 which is parallel with the axis of the spool 82. A bolt 85a secured to an end of the sensor shoe 85 engages with an end of a bolt 83a secured to the spring retainer 83, and the other end of the sensor shoe 85 engages with an outside periphery 36d of the movable disc 36b. Thus, the position of the movable disc 36b which means the transmission ratio during the operation is transmitted to the spool 82 through the spring 84. At the end of the valve body 81, opposite to the spring 84, pitot pressure is applied to the end chamber 81a, and oil pressure is applied to port 81b through the passage 71. A port 81e which is provided between the chamber 81a and the port 81b for preventing the leakage of the oil dependent on the line pressure, is communicated with the oil reservoir 70 through drain passages 74a. The port 81c is communicated with the port 81d through a chamber formed on a land 82a of the spool 82 when the spool is shifted to the right, so that the line pressure can be regulated.

Thus, the spool 82 is applied with the pitot pressure and oil pressure so as to be moved in the direction to open the port 81d, whereas the elastic force of the spring 84 corresponding to the transmission ratio detected by the sensor shoe 85 urges the spool 82 in the direction to close the port 81d. Accordingly, high line pressure generates at the port 81g at a low engine speed with a large transmission ratio. The sensor shoe 85 is moved to the right in FIG. 2b as the transmission ratio decreases, reducing the force of the spring 84 to lower the line pressure. The line pressure exerts on the belt 34 at a proper force dependent on the transmission ratio so as not to cause the belt to slip on the pulleys.

The transmission ratio control valve 90 further comprises an annular groove 92a formed on the spool 92 so as to communicate the port 91b with the port 91c or port 91d for supplying or discharging line pressure to or from the drive pulley servo chamber 38b in dependence on the position of the spool 92. A regulator spring 97 is provided between the operating plunger 93 and a retainer 96 securely mounted on a projecting end of a modulator plunger 95 which is slidably provided in an axial cavity 92c in the spool 92. A spring 98 is provided between a flange of the plunger 95 and a retainer 92b of the spool 92. The force of the regulator spring 97 is decided by the projecting extent of the plunger 95 from the spool 92 and the position of the plunger 95 is dependent on the line pressure at the port 91c which is supplied to a space defined by the flange of the plunger 95 and the inside wall of the spool 92 through a small aperture 99.

The plunger 93 is slidably mounted in the valve body 91 and has an axial cavity 93c. A rod 101 is axially slidably mounted in the valve body 91, and a flange 103 of the rod 101 is slidably engaged with the wall of the cavity 93c. A small spring 102 is provided between the flange 103 and the plunger 93. The pitot pressure is applied to a chamber 91a through a port 92d. The cavity 93c is supplied with the pitot pressure through a port 91f and a passage 106 having an orifice 105. A spring 107 is provided between an end of the spool 92 and the valve body 91 to adjust the load on the spring 102. An end of the rod 101 engages with a cam 100 which is operatively connected to an accelerator pedal 100a of the vehicle so as to be rotated in dependence on the depression of the pedal 100a.

When the spool 92 is moved by the pitot pressure to communicate the port 91c with port 91b, the line pressure is applied to the servo chamber 38b of the drive pulley 36 to upshift the transmission. On the other hand, when the port 91b communicates with the port 91d, the chamber 38b is drained to downshift.

The select position detecting valve 110 comprises a valve body 111, a valve 113 having a drain aperture 112 which is slidably mounted in the valve body 111, a spring 114 for urging the valve 113 to a cam 115 which rotates according to the position of the selector lever 117. The cam 115 has a lobe 115a which is corresponding to D, N, R range positions, and lobes 115b formed in the both sides of the lobe 115a, corresponding to P and Ds range positions. At the D, N, R range positions, the lobe 115a pushes the valve 113 in the direction to close the drain aperture 112, so that actuating oil pressure is built up. At the P and Ds range positions, the valve 113 moves outwards to open the drain aperture 112 to drain the oil therefrom, so that the oil pressure in the passages 88 and 79 is reduced. At that time the oil pressure in the oil passage 88 decreases gradually, because of an orifice 116 provided in the oil passage 88. The oil pressure is applied to an actuator 120.

The actuator 120 comprises a cylinder 121, a piston 122 which is slidably mounted in the cylinder 121, and a spring 123 for urging the piston 122 to a piston chamber 124 to which actuating oil pressure is applied through a passage 88. Further, a connecting rod 125 is secured to an outer end of a rod 122a of the piston 122 and is engageable with a pin 108 on the rod 101 of the transmission ratio control valve 90. At the P range or Ds range, since no actuating oil pressure exists, piston 122 presses the rod 101 a predetermined stroke by the spring 123 to the left in FIG. 2c, through the rod 125, controlling the transmission zone to the side of high engine revolution. Thus, the releasing of the accelerator pedal 100a at Ds range causes the downshift of the transmission, so that the engine braking effects. Further, a correction lever 128 rotatably supported by a pin 127 is provided between the sensor shoe 85 and the rod 125, in order to correct the characteristics in the Ds range. One end of the lever 128 engages with the rod 125 only when piston 122 of the actuator 120 moves to the left. Under such a condition, when the transmission is downshifted to shift the disk 36b to the left, the sensor shoe 85 engages with the end of lever 128 to rotate it. Thus, the rod 125 and piston 122 are moved toward the right as the transmission ratio increases, and, at the maximum transmission ratio, the piston 122 is returned to the right end position.

Figure 3A:
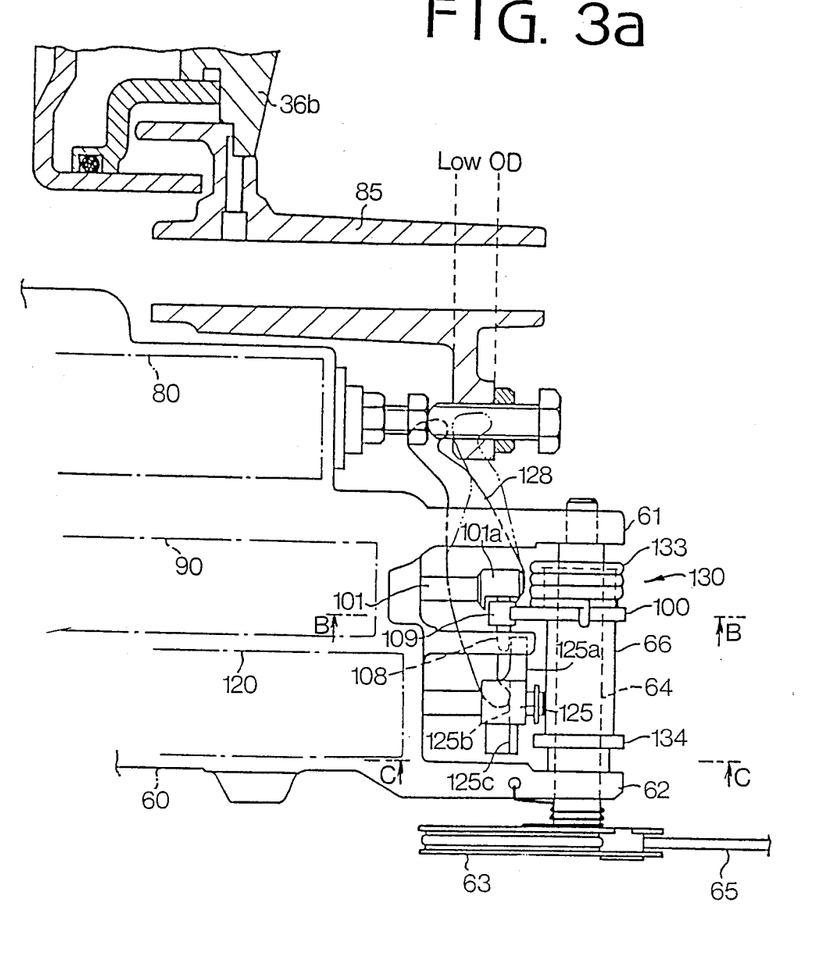
FIG. 3a is a plan view of a modulator device of the present invention.
Figure 3B:
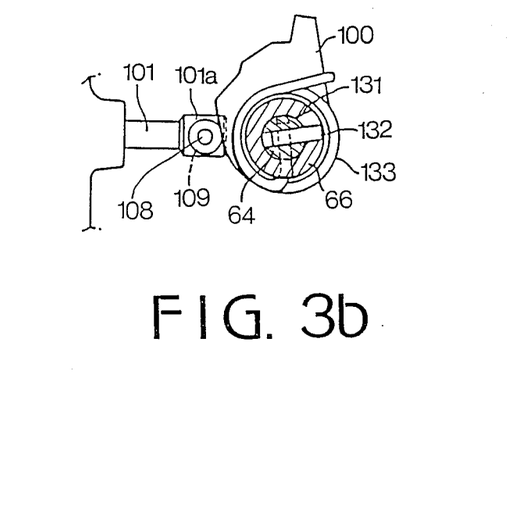
Figure 3C:
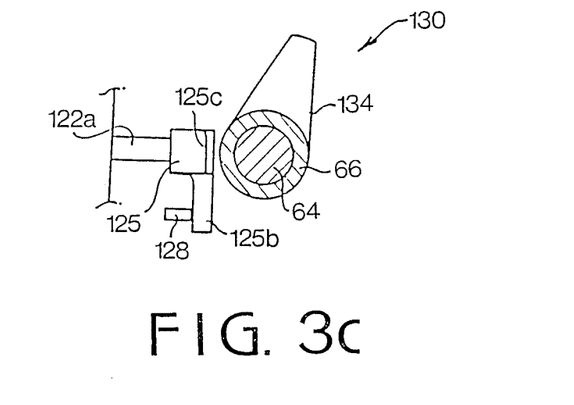

Referring to FIGS. 3a to 3c, the line pressure control valve 80, transmission ratio control valve 90 and actuator 120 are parallelly disposed in that order in a frame 60. The sensor shoe 85 is disposed outside of the frame 60 adjacent the line pressure control valve 80, and a modulator device 130 for the transmission ratio control valve 90 is disposed outside of the frame 60 adjacent to the transmission ratio control valve 90 and to the actuator 120, perpendicular thereto. The modulator device 130 comprises an inner shaft 64 rotatably supported by a pair of supporting arms 61 and 62 of the frame 60, and a tubular outer shaft 66 rotatably mounted on the inner shaft 64 between the support arms 61 and 62. Cams 100 and 134 are securely mounted on the outer shaft 66. A lever 63 which is connected to the accelerator pedal through a cable 65 is securely mounted on the inner shaft 64 at the outer side of the arm 62.

As shown in FIG. 3b, a pin 132 which engages with an elongated aperture 131 formed on the outer shaft 66 is radially inserted in the inner shaft 64 and secured thereto. Since the length of the aperture 131 is larger than the diameter of the pin 132, the inner shaft 64 is capable of rotating a predetermined degree relative to the outer shaft 66. Disposed around the outer shaft 66 is a torsion spring 133. One end of the spring 133 is secured to the cam 100 and the other end to the inner shaft 64.

The rod 101 of the transmission ratio control valve 90 has a head portion 101a. A pin 108 is projected from the head portion 101a and a roller 109 on which the cam 100 abuts is rotatably mounted on the pin 108. The pin 108 is extended to a lug 125a horizontally projected from the connecting rod 125. The lug 125a is arranged to engage with the pin 108 when the rod 122a of the actuator 120 is moved to the left by spring 123. A lug 125b is formed on the underside of the connecting rod 125 so as to abut against the tip end of the lever 128. A lug 125c is also formed on the rod 125 opposite the lug 125a so as to engage with the cam 134 as shown in FIGS. 4b and 4c.

The operation of the system is described hereinafter with reference to FIGS. 4a to 4c. While the vehicle is at a stop, the driven pulley servo chamber 39b is supplied with the line pressure adjusted by the pressure regulator valve 80 through the passages 71, 72, and the drive pulley servo chamber 38b is drained, since the spool 92 is at the left end position by the spring 94. Thus, the driving belt 34 engages with the driven pulley 37 at a maximum running diameter to provide the largest transmission ratio iL (low speed stage) in the graph shown in FIG. 6. On the other hand, the selector lever 117 is at the N range position to select the N range, so that the drain aperture 112 of the select position detecting valve 110 is closed. When the D range is selected, the input shaft 13 and the main shaft 20 are connected to each other in the selector device 23 by the selector 117.

Figure 4A:
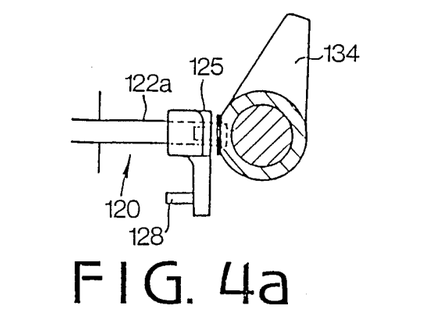
FIGS. 4a to 4c show sectional views of the modulator device, for describing the operation thereof.
Figure 4B:
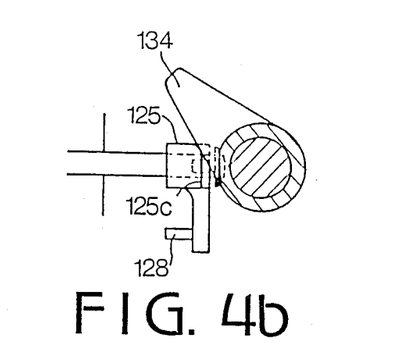
Figure 4C:
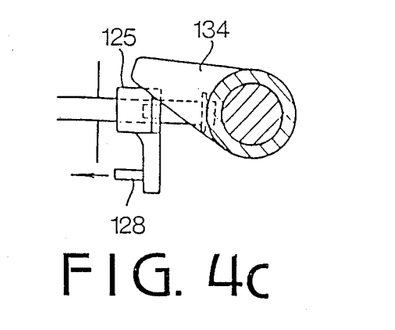

At that time, since the accelerator pedal 100a is released, the cam 100 is at a substantially vertical position as shown in FIG. 4a. Accordingly, the rod 101 projects out of the valve body 91 so that minimum load is exerted on the spring 94. The cam 134 is also at a substantially vertical position so as not to engage with the lug 125c, although the rod 125 is positioned at an outermost position (right end position) by the lever 128.

When the accelerator pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to axles of the driving wheels. Thus, the engine is started.

When the pitot pressure rises, the spool 92 is shifted to the right, so that the line pressure is applied to the servo chamber 38b to move the disc 36b to the right. Thus, the transmission starts to upshift to the smallest transmission ratio iH.

When the depression of accelerator pedal exceeds a predetermined degree, the cam 100 is rotated to a position shown in FIG. 4b, thereby pressing the rod 101 to the left. Thus, a larger load is exerted on the spring 97 of the transmission ratio control valve 90. However, when the cam 134 which is rotated together with the cam 100 abuts against the lug 125c of the connecting rod 125, the rotation of the cam 100 is stopped. Accordingly, a load which is smaller than the load determined for that magnitude of the wide-open throttle is exerted on the spring 94. When the accelerator pedal 100a is further depressed, to increase engine speed, the transmission ratio starts to change at a low engine speed at a point $P_1$ in FIG. 6. At that time, since the lever 63 is rotated corresponding to the depression of the accelerator pedal, the inner shaft 64 is further rotated as long as the pin 132 is allowed to move in the aperture 131. Accordingly, the torsion spring 133 is twisted to cause a predetermined torsion in the spring 133.

As the transmission ratio starts to change, sensor shoe 85 is shifted to the right toward the line indicated as OD in FIG. 3a. The lever 128 is rocked by the force of the spring 123, so that the cam 100 gradually pushes the rod 101 through the roller 109. Thus, the cam 134 is able to further rotate in the counterclockwise direction in FIG. 4c thereby allowing the cam 100 to rotate by the torsion spring 133 until the original relative position of the outer tubular shaft 66 to the inner shaft 64 is restored. Accordingly, the rod 101 is further pressed into the valve body 91 so as to increase the load of the spring 94. Thus, the transmission is gradually upshifted. After the cam 100 is rotated to a position corresponding to the degree of the depression of the accelerator pedal at a point $P_2$, the transmission is further upshifted while the engine speed is constant.

Accordingly, a large modulator zone $\Delta NE$ is obtained. When the kickdown is operated at the point A, the transmission ratio starts to change at a point B at an engine speed lower than the engine speed at the point B'. Thus, increment of engine speed becomes smaller.

Figure 5A:
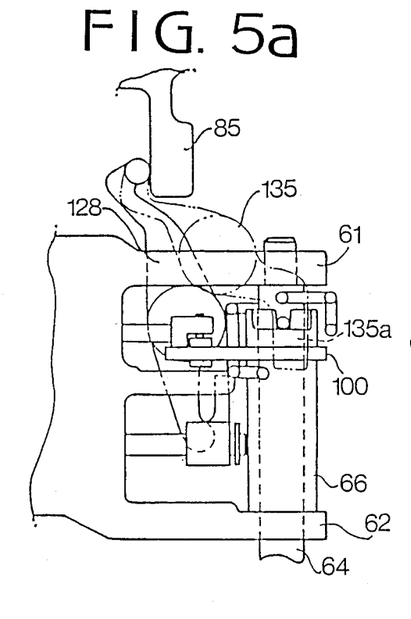
FIG. 5a is a plan view of another example of the modulator device.
Figure 5B:
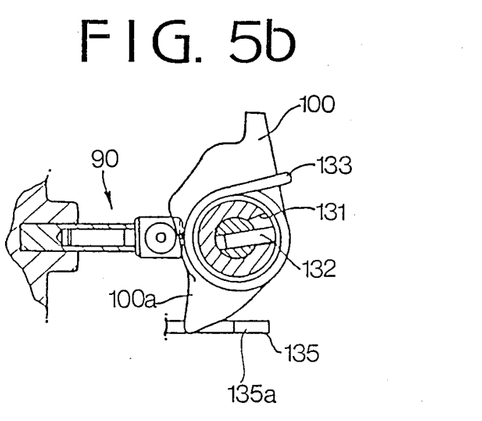

Referring to FIGS. 5a and 5b, in another example of the modulator device 130, a stopper lever 135 is provided instead of the cam 134 and lug 125c. On end of the stopper lever 135 engages with the sensor shoe 85 and the other end has a projection 135a extending toward the cam 100. The cam 100 of the present example has a projection 100a which abuts against the projection 135a. Accordingly, the rotation of the cam 100 is stopped when the projection 100a engages the projection 135a.

From the foregoing, it will be understood that the present invention provides a transmission ratio control system wherein the transmission ratio starts to change at a low engine speed so that driveability of the vehicle is improved and the shock at kickdown is reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An improved control system for a continuously variable transmission for transmitting the power of an automotive engine to driving wheels of a vehicle, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a hydraulic circuit having a pump for supplying oil to both the hydraulic cylinders and a drain passage for draining oil in the hydraulic cylinder of the drive pulley, a transmission ratio control valve having a plunger slidably mounted in a valve body, a spool for controlling the oil supplied to the cylinder of the drive pulley and the oil drained from the cylinder to change the transmission ratio, at least one spring provided between the plunger, and the spool, a cam operatively connected with an accelerator pedal of the vehicle, for shifting the plunger of the transmission ratio control valve in accordance with depression of the accelerator pedal, pitot pressure apply means for applying pitot pressure dependent on engine speed to the spool to compress the spring, wherein the improvement comprises:

stopping means for stopping the cam at a predetermined angular position thereof;

yieldable means provided in a connecting member disposed between the cam and the accelerator pedal for allowing further depression of the accelerator pedal after the stop of the cam;

said stopping means including means for progressively displacing the stopping means as the transmission is upshifted so that the cam is further rotated to compress the spring.

2. The system according to claim 1 wherein the stopping means comprises a stop cam and a stop member operatively connected to the shiftable disc of the drive pulley so as to be moved with the movement of the disc in the upshift direction.

3. The system according to claim 2 wherein the yieldable means is a spring provided between the cam and a shaft which is provided for rotatably supporting the cam and operatively connected to the accelerator pedal.

* * * * *